(12) United States Patent
Arslan et al.

(10) Patent No.: US 7,321,646 B2
(45) Date of Patent: Jan. 22, 2008

(54) METHODS AND APPARATUS FOR PRE-FILTERING A SIGNAL TO INCREASE SIGNAL-TO-NOISE RATIO AND DECORRELATE NOISE

(75) Inventors: Huseyin Arslan, Tampa, FL (US); Abdulrauf Hafeez, Cary, NC (US); Rajaram Ramesh, Cary, NC (US); Dennis Hui, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 710 days.

(21) Appl. No.: 10/716,085

(22) Filed: Nov. 18, 2003

(65) Prior Publication Data

US 2005/0105646 A1 May 19, 2005

(51) Int. Cl.
*H04B 1/10* (2006.01)
(52) U.S. Cl. ...................... 375/346; 375/148
(58) Field of Classification Search ......... 375/346–350
See application file for complete search history.

(56) References Cited

U.S. PATENT DOCUMENTS

| | | | |
|---|---|---|---|
| 5,946,351 A * | 8/1999 | Ariyavisitakul et al. ..... 375/233 |
| 6,108,517 A | 8/2000 | Arslan et al. ................. 455/21 |
| 6,314,147 B1 * | 11/2001 | Liang et al. ................. 375/346 |
| 6,452,981 B1 | 9/2002 | Raleigh et al. ............. 375/299 |
| 6,466,616 B1 | 10/2002 | Stenstrom et al. .......... 375/233 |
| 2002/0110205 A1 | 8/2002 | Piirainen ..................... 375/346 |
| 2002/0176492 A1 | 11/2002 | Zangi et al. ................. 375/233 |
| 2003/0035491 A1 | 2/2003 | Walton et al. .............. 375/267 |
| 2003/0063596 A1 | 4/2003 | Arslan et al. ............... 370/347 |
| 2004/0017846 A1 * | 1/2004 | Fernandez-Corbaton et al. 375/152 |

FOREIGN PATENT DOCUMENTS

| | | |
|---|---|---|
| EP | 0952711 | 10/1999 |
| EP | 1289182 | 3/2003 |
| WO | WO 01/15399 | 3/2001 |
| WO | WO 01/35608 | 5/2001 |
| WO | WO 02/33923 | 4/2002 |

OTHER PUBLICATIONS

Al-Dhahir et al. "The Finite-Length Multi-Output MMSE-DFE" *IEEE Transactions on Signal Processing* 48(10): 2921-2936 (2000).
Al-Dhahir et al. "Finite-Length MIMO Decision Feedback Equalization for Space-Time Block-Coded Signals Over Multipath-Fading Channels" *IEEE Transactions on Vehicular Technology* 50(4): 1176-1182 (2001).

(Continued)

*Primary Examiner*—Curtis Odom
(74) *Attorney, Agent, or Firm*—Michael Cameron

(57) ABSTRACT

To receive a signal from a multiple-input-multiple-output (MIMO) communication channel, initial channel taps are generated based on an impulse response estimate of the MIMO communication channel. The received signal is pre-filtered using the initial channel taps to generate output channel taps and a corresponding output signal having an increased signal-to-noise ratio (SNR) and uncorrelated noise. The SNR is based on a ratio of the energy in a first subset of the output channel taps to the energy in a second subset of the output channel taps.

6 Claims, 2 Drawing Sheets

OTHER PUBLICATIONS

Al-Dhahir "FIR Channel-Shortening Equalizers for MIMO ISI Channels" *IEEE Transactions on Communications* 49(2): 213-218 (2001).

Al-Dhahir "Finite-Length Channel-Shortening Space-Time Equalizers for MIMO Linear Frequency-Selective Channels" *IEEE Signals, Systems and Computers* 1: 705-709 (2000).

Melsa et al. "Impulse Response Shortening for discrete Multitone Transceivers" *IEEE Transactions on Communications* 44(12): 1662-1672 (1996).

Younis et al. "Joint Prefiltering and MLSE Equalization of Space-Time-Coded Transmissions Over Frequency-Selective Channels" *IEE Transactions on Vehicular Technology* 51(1): 144-154 (2002).

Fragouli et al. "Prefiltered Space-Time M-BCJR Equalizer for Frequency-Selective Channels" *IEEE Transactions on Communications* 50(5): 742-753 (2002).

Duel-Hallen "Delayed Decision-Feedback Sequence Estimation" *IEEE Transactions on Communications* 37(5): 428-436 (1989).

Al-Dhahir "Finite-Length Channel-Shortening Space-Time Equalizers for MIMO Linear Frequency-Selective Channels" *Signals, Systems, and Computers, 2000. Conference Record of the Thirty-fourth Asilomar Conference* 1: 705-709(2000).

Bauch "Reduced-Complexity Space-Time Turbo-Equalization for Frequency-Selective MIMO Channels" *IEEE Transactions on Wireless Communications* 1(4): 819-828 (2002).

Hafeez et al. "Interference Cancellation for EDGE via Two-User Joint Demodulation" *2003 58th IEEE Vehicular Technology Conference* 2: 1025-1029 (2003).

International Search Report and Written Opinion for Application No. PCT/US2004/038412 mailed on Apr. 19, 2005.

Ramesh et al. "Prefilter Design for Low-Complexity Equalization of MIMO Systems" *2004 IEEE 59th Vehicular Technology Conference* 2: 871-875 (2004).

Zangi et al. "Physical-Layer Issues for Deploying Transmit Diversity in GPRS/EGPRS Networks" *IEEE 54th Vehicular Technology Conference* 2: 538-542 (2001).

Al-Dhahir et al. "The Finite-Length Multi-Input Multi-Output MMSE-DFE," *IEEE Transactions on Signal Processing*, 48(10): 2921-2936 (Oct. 2000).

Al-Dhahir, Naofal "FIR Channel-Shortening Equalizers for MIMO ISI Channels," *IEEE Transactions on Communications*, 49(2) 213-218 (Feb. 2001).

Duel-Hallen et al. "Delayed Decision-Feedback Sequence Estimation," *IEEE Transactions on Communications*, 37(5) 428-435 (May 1989).

Duel-Hallen, Alexandra "Equalizers for Multiple Input/Multiple Output Channels and PAM Systems with Cyclostationary Input Sequences," *IEEE Journal on Selected Areas in Communications* 10(3) 630-639 (Apr. 1992).

* cited by examiner ic # METHODS AND APPARATUS FOR PRE-FILTERING A SIGNAL TO INCREASE SIGNAL-TO-NOISE RATIO AND DECORRELATE NOISE

BACKGROUND OF THE INVENTION

This invention relates to digital communications apparatus and methods, and more particularly to apparatus and methods for filtering channel taps of a signal in a communication channel.

Digital communications systems are widely used for voice, image and data communications. When communicating wirelessly, time-varying multipath fading of wireless channels and co-channel interference among wireless channels can make such communications unreliable. Equalization may be used to compensate for the effects of multipath fading and co-channel interference. Some types of equalizers include Maximum Likelihood Sequence Estimation (MLSE), Decision Feedback Equalization (DFE), and Decision Feedback Sequence Estimation (DFSE), reduced-state sequence estimation (RSSE), and a M-algorithm technique.

Multiple-input-single-output (MISO) and Multiple-input-multiple-output (MIMO) channels arise in many communication applications. A MISO channel a may arise when a receiver performs joint detection on co-channel signals using a single antenna. A MIMO channel may arise when a receiver uses antenna diversity, or uses one or multiple antennas for interference rejection, and/or performs multiuser demodulation and/or multicarrier detection.

Equalization of MIMO channels can be particularly difficult because receiver complexity can grow exponentially with the number of channel impulse response taps (or channel memory) of a received signal. A pre-filter may be used to shape or shorten the channel impulse response taps, which may allow the use of an equalization technique that has a lower complexity than MLSE, such as, for example, DFE, DFSE, RSSE, and the M-algorithm technique.

BRIEF SUMMARY OF THE INVENTION

In some embodiments of the present invention, a signal is received from a multiple-input-multiple-output (MIMO) communication channel. Initial channel taps are generated based on an impulse response estimate of the MIMO communication channel. The received signal is pre-filtered using the initial channel taps to generate output channel taps and a corresponding output signal having increased signal to noise ratio (SNR) and uncorrelated noise. The SNR is based on a ratio of the energy in a first subset of the output channel taps to the energy in a second subset of the output channel taps.

In some further embodiments of the present invention, the received signal may be pre-filtered to maximize the SNR. The received signal may be pre-filtered so that, the second subset of the channel taps includes all channel taps except for the channel taps in the first subset. In some other embodiments of the present invention, the received signal may be pre-filtered so that the second subset of the channel taps includes all channel taps except for the channel taps in the first subset and except for a predetermined number of channel taps that follow the channel taps in the first subset, and which may immediately follow the channel taps in the first subset.

In yet some further embodiments of the present invention, some of the channel taps in the first subset may be scaled differently than other channel taps in the first subset. Some of the channel taps in the second subset may be scaled differently than other channel taps in the second subset. Some of the channel taps in the first subset may be scaled differently than some of the channel taps in the second subset.

In yet some further embodiments of the present invention, the SNR is based on a ratio of the energy in a first subset of the channel taps to the sum of the energy in the output noise and the energy in a second subset of the channel taps.

The output signal may be equalized to provide an estimate of an information sequence in the received signal from the communication channel.

DETAILED DESCRIPTION OF THE INVENTION

Figure 1:
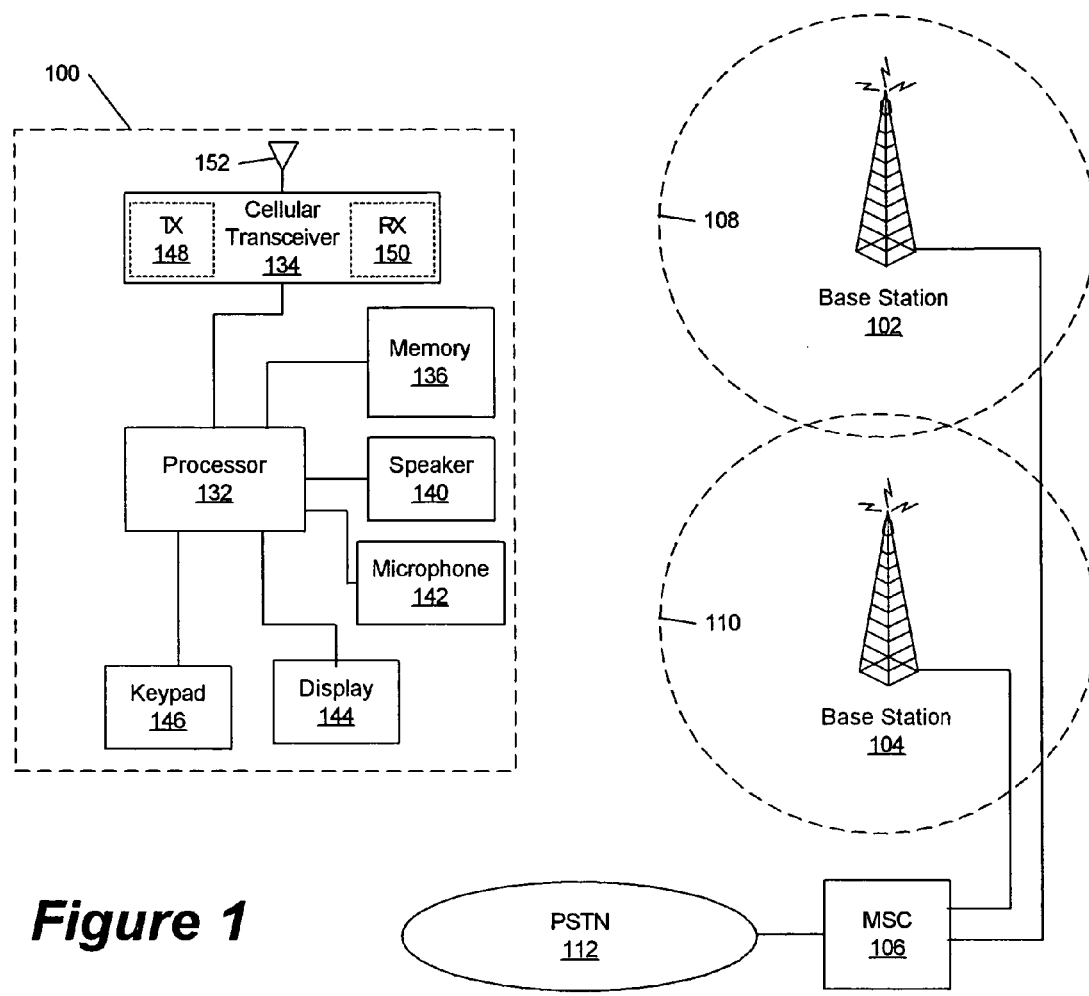
FIG. 1 is a block diagram of a wireless communication system according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refers to like elements throughout.

It also will be understood that, as used herein, the term "comprising" or "comprises" open-ended, and includes one or more stated elements, steps and/or functions without precluding one or more unstated elements, steps and/or functions.

The present invention is described below with reference to block diagrams and/or operational illustrations of methods and wireless terminals according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "wireless terminal" includes, but is not limited to, a terminal that is configured to communicate via a wireless interface such as, for example, a cellular interface, a wireless local area network interface (WLAN), Bluetooth interface, another RF communication interface, and/or an optical interface. Example wireless terminals include, but not limited to, a cellular wireless terminal; a personal communication terminal that may combine a cellular wireless terminal with data processing. facsimile and data communications capabilities; a personal data assistance (PDA) that can include a wireless transceiver, pager, Internet/intranet access, local area network interface, wide area network interface, Web browser, organizer, and/or calendar; and a mobile or fixed computer or other device that includes a wireless transceiver. The wireless terminal may be configured to communicate via a cellular communication link that may include a protocol such as, for example, ANSI-136, Global Standard for Mobile (GSM) communication, General Packet Radio Service (GPRS), enhanced data rates for GSM evolution (EDGE), code division multiple access (CDMA), wideband-CDMA, CDMA2000, and UMTS. Communication protocols as used herein may specify the information communicated, the timing, the frequency, the modulation, and/or the operations for setting-up and/or maintaining a communication connection.

FIG. 1 is a functional block diagram of an exemplary wireless communication system that includes a plurality of base stations 102 and 104 that are connected to one or more mobile services switching centers (MSC) 106. Each of the base stations 102 and 104 are located in, and provide services to, a geographic region referred to as a cell, 108 and 110, respectively. In general, there is one base station for each cell. Within each cell, there may be a plurality of wireless terminals 100 that communicate via radio link with a base station that services the cell in a manner well known in the art. The base stations 102 and 104 allow a user of the wireless terminal 100 to communicate with other wireless terminals 100, or with users connected to a Public Switched Telephone Network (PSTN) 112. The MSC 106 routes calls to and from the wireless terminal 100 through one of the base stations 102 and 104 that, for example, provides the strongest communication link to the wireless terminal 100. Information concerning the cell location and activity status of the wireless terminal 100 is stored in a Home Location Register (not shown) and a Visitor Location Register (not shown), which may be incorporated into, or otherwise communicate with, the MSC 106. Although only two cells 108 and 110 are shown for illustration purposes, a typical cellular communications system may include hundreds of cells and may service thousands of wireless terminals 100.

The wireless terminal 100 includes a processor 132, a transceiver 134, a memory 136 and may also include a speaker 140, a microphone 142, a display 144, and a keypad 146. The memory 136 may include one or more erasable programmable read-only memories (EPROM or Flash EPROM), battery backed random access memory (RAM), magnetic, optical, or other digital storage device, and may be separate from, or at least partially within, the processor 132. The processor 132 may include more than one processing component, such as, for example, a general purpose processor and a digital signal processor, which may be enclosed in a common package or separate and apart from one another. The transceiver 134 typically includes both a transmitter 148 and a receiver 150 to allow two way communications, but the present invention is not limited to such devices and, as used herein, a "transceiver" may include only the receiver 150. The wireless terminal 100 may communicate with the base stations 102 and 104 using radio frequency signals, which may be communicated through an antenna 152 over one or more communication channels according to one or more cellular communication protocols.

Figure 3:
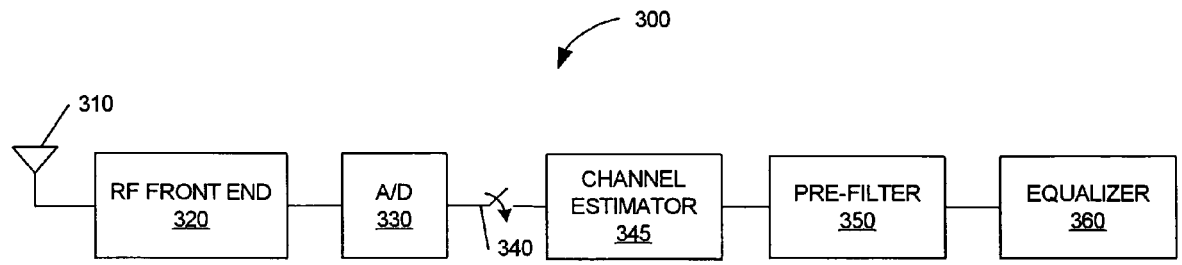
FIG. 3 is a block diagram of a receiver according to some embodiments of the present invention.

FIG. 3 is a block diagram of a receiver 300 according to various embodiments of the present invention. The receiver 300 may be used, for example, as receiver 150 in FIG. 1. An antenna 310 is configured to receive an incident signal from a MIMO communication channel. An RF front end 320 downconverts the received signal to a baseband frequency and amplifies the downconverted signal. The signal is then converted to a digital signal by an analog-to-digital converter 330 and downsampled to a lower data rate by a digital sampler 340. A channel estimator 345 generates channel taps based on an impulse response estimate of the digital signal from the digital sampler 340. A pre-filter 350 pre-filters the received signal to generate an output signal having increased signal-to-noise ratio (SNR) and uncorrelated noise. The SNR is based on a ratio of energy in a first subset of the output channel taps to energy in a second subset of the output channel taps. The pre-filter 350 may pre-filter the received signal to maximize the SNR at the output.

The pre-filter 350 may pre-filter the received signal based on Channel Shortening Equalization (CSE) filtering in which it pre-filters the received signal with the second subset of the channel taps including all channel taps except for the first subset of the channel taps. The pre-filter 350 may alternatively pre-filter the channel taps based on Decision Feedback Equalization (DFE) filtering in which it pre-filters the received signal with the second subset of the channel taps including all channel taps except for the first subset of the channel taps and except for a predetermined number of channel taps following, or immediately following, the first subset of the channel taps.

An equalizer 360 equalizes the output signal to provide an estimate of an information sequence in the received signal from the MIMO communication channel.

In some embodiments of the present invention, the pre-filter 350 is a FIR pre-filter that maximizes the SNR for MIMO systems. The SNR may be a sum of output branch SNRs under the condition that the branch noises are uncorrelated. The SNR may be based on event error analysis of MIMO systems. The pre-filter 350 may be a maximum-SNR (Max-SNR) class of pre-filters that includes CSE and DFE pre-filters, and which are referred to herein as Max-SNR-CSE and Max-SNR-DFE pre-filters, respectively. Moreover, some embodiments of the pre-filter 350 are configured as a hybrid pre-filter. A Max-SNR-DFE pre-filter may differ from a MMSE-DFE pre-filter in that the Max-SNR-DFE pre-filter maximizes the SNR, while the MMSE-DFE pre-filter minimizes the error (or noise) while constraining the signal to be an identity matrix. The hybrid Max-SNR-CSE pre-filter differs from the Max-SNR-CSE pre-filter in that the suppression of the feedback taps is relaxed in the hybrid pre-filter. Some embodiments of the pre-filter 350 allow the input channel responses to be delayed with respect to each other to match their channel phase characteristics.

Figure 2:
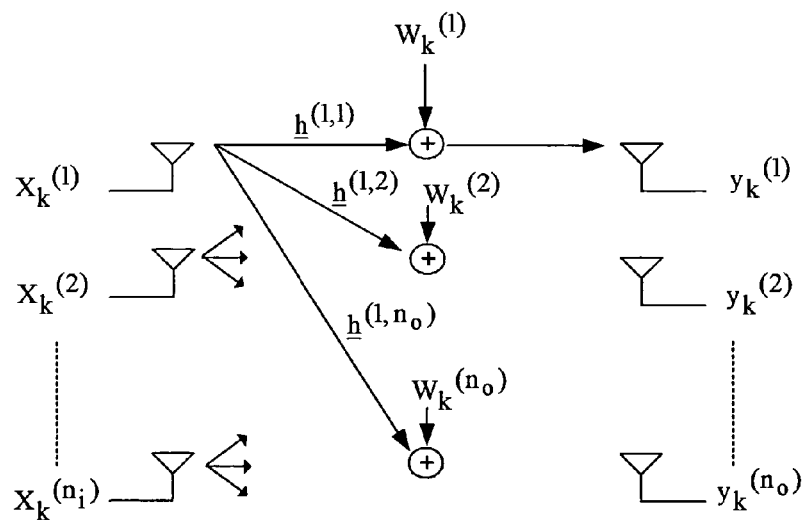
FIG. 2 illustrates a multiple-input-multiple-output channel model according to some embodiments of the present invention.

The communication channel and receiver 300 may be mathematically modeled as described below. For purposes of illustration only, the communication channel and receiver 300 are assumed to have $n_i$ inputs and $n_o$ outputs that are affected by inter-symbol interference (ISI) and additive zero-mean noise. FIG. 2 shows such a communication channel having $n_i$ transmitting antennas and $n_o$ receiving antennas, and where $x_k^{(i)}$, $y_k^{(j)}$, $w_k^{(j)}$ and $h_m^{(i,j)}$ are the ith channel input, the jth channel output, the noise affecting the jth output and the mth channel tap between the ith input and the jth output at time k, respectively. The complex-valued baseband signal may be modeled as $$\underline{y}_k = \sum_{m=0}^{L} H_m \underline{x}_{k-m} + \underline{w}_k, \quad (1)$$

where $\underline{y}_k=[y_k^{(1)},y_k^{(2)},\ldots,y_k^{(n_o)}]^T$, $\underline{x}_k=[x_k^{(1)},x_k^{(2)},\ldots,x_k^{(n_i)}]^T$ and $\underline{w}_k=[w_k^{(1)},w_k^{(2)},\ldots,w_k^{(n_o)}]^T$ are the channel output vector, the channel input vector, and the noise vector for time k, respectively, and $H_m$ is the $n_o \times n_i$ matrix channel tap where L is the channel memory. By stacking M samples of the output vector, the system model may be equivalently written as Equation 2 below, $$\begin{bmatrix} \underline{y}_{k+M-1} \\ \underline{y}_{k+M-2} \\ \vdots \\ \underline{y}_k \end{bmatrix} + \begin{bmatrix} H_0 & H_1 & \cdots & H_L & 0 & \cdots & 0 \\ 0 & H_0 & H_1 & \cdots & H_L & \ddots & \vdots \\ \vdots & \ddots & & & & & 0 \\ 0 & \cdots & 0 & H_0 & H_1 & \cdots & H_L \end{bmatrix} \begin{bmatrix} \underline{x}_{k+M-1} \\ \underline{x}_{k+M-2} \\ \vdots \\ \underline{x}_{k-L} \end{bmatrix} + \begin{bmatrix} \underline{w}_{k+M-1} \\ \underline{w}_{k+M-2} \\ \vdots \\ \underline{w}_k \end{bmatrix}, \quad (2)$$

or which may be more compactly written as Equation 3, $$\underline{y}=H\underline{x}+\underline{w}, \quad (3)$$

where the matrix H is $n_o M \times n_i(L+M)$.

For purposes of illustration only, the pre-filter 350 may be modeled as follows. Let $F=[F_0^H, F_1^H, \ldots, F_{M-1}^H]^H$ be a MIMO pre-filter with M matrix taps of size $n_o \times n_o$ each. The $n_o \times 1$ filtered signal vector $\underline{y}'$ is provided by $$\underline{y}'=F^H\underline{y}=F^H H \underline{x}+F^H \underline{w}. \quad (4)$$

Note that the $n_i(L+M)$ columns of the matrix $F^H H$ represent L+M taps of the filtered channel response. The filtered channel taps are divided into two groups: "desired channel taps $F^H H \Delta_d$" and "undesired channel taps $F^H H \Delta_u$", where $\Delta_d$ and $\Delta_u$ are diagonal matrices that select the columns of the matrix H corresponding to the desired and undesired channel taps, respectively. By selecting appropriate matrices $\Delta_d$ and $\Delta_u$, the filter can be designed for channel shortening equalization (CSE), decision feedback equalization (DFE) or a combination thereof (hybrid). This will be discussed in detail further below However, the design problem is first described as follows.

The filtered signal corresponding to the desired channel taps, given by $F^H H \Delta_d \underline{x}$, is referred to as the "filtered desired signal". The sum of the undesired signal and noise after pre-filtering, given by $\underline{z}=F^H \Delta_u \underline{x}+F^H \underline{w}$, is referred to as the "filtered noise". In some embodiments of the present invention, the energy in the filtered desired signal is maximized relative to the energy in the filtered noise. It is assumed that the input and noise are mutually uncorrelated and have autocorrelation matrices $R_x=E[\underline{x}\underline{x}^H]$ and $R_w=E[\underline{w}\underline{w}^H]$, respectively. The autorcorrelation of the filtered desired signal is then given by $F^H BF$, where $B=H\Delta_d R_x \Delta_d^H H^H$ is the autocorrelation of the input desired signal. The autocorrelation of the filtered noise is provided by $$E[\underline{z}\underline{z}^H]=F^H AF, \quad (5)$$

where $A=H\Delta_u R_x \Delta_u^H H^H+R_w$ is the autocorrelation of the total noise (undesired signal plus noise). The filtered noise has zero mean if the input x has zero mean. Note that the filtered desired signal and noise power for the nth output branch is given by $\underline{f}_n^H B \underline{f}_n$ and $\underline{f}_n^H A \underline{f}_n$, respectively, where $\underline{f}_n$ (the nth column of the matrix F) is the pre-filter for the nth output branch.

Assuming that the filtered noise affecting the output branches is independent, i.e., $$\underline{f}_n^H A \underline{f}_m=0 \forall m \neq n. \quad (6)$$

The SNR is then $$SNR = \sum_{n=1}^{n_o} SNR_n, \quad (7)$$

where $SNR_n$ is the signal-to-noise ratio for the nth output branch, provided by $$SNR_n = \frac{\underline{f}_n^H B \underline{f}_n}{\underline{f}_n^H A \underline{f}_n}. \quad (8)$$

The pre-filter may be configured to maximize the SNR as provided by Equation 7.

Assuming that the total noise autocorrelatin matrix A is positive definite, such as in the presence of ambient or thermal noise, the matrix A can be decomposed as:

$$A=U\Gamma^2 U^H, \quad (9)$$

where $\Gamma^2$ is a diagonal matrix containing the eigen-values of the matrix A which are all positive and the matrix U is unitary. Letting $P=\Gamma U^H F$ the SNR is given by $$SNR = \sum_{n=1}^{n_o} \frac{\underline{p}_n^H C \underline{p}_n}{\underline{p}_n^H \underline{p}_n}, \quad (10)$$

where $\underline{p}_n$ is the nth column of the matrix P and $C=\Gamma^{-1}U^H BU\Gamma^{-1}$. Assuming that the vector $\underline{p}_n$ has unit power for all n, the SNR is provided by $$SNR = \sum_{n=1}^{n_o} \underline{p}_n^H C \underline{p}_n \quad (11)$$

The SNR may be maximized under the condition $$\underline{p}_n^H \underline{p}_m = \begin{cases} 1 & n=m \\ 0 & n \neq m \end{cases} \quad (12)$$

which follows from Equation 6. Note that the matrix C is positive semi-definite. Therefore, it can be decomposed as $C=V\Lambda^2 V^H$, where the matrix $\Lambda^2$ is a diagonal matrix comprising non-negative eigen-values $\lambda_n^2$ of the matrix C and the matrix V is unitary.

The maximum SNR that is obtained by Equation 12 is provided by $$SNR = \sum_{n=1}^{n_o} \lambda_n^2, \quad (13)$$

where $\lambda_n^2$ are the $n_o$ largest eigen-values of the matrix C. The filters $F^{opt}=[\underline{f}_1^{opt},\underline{f}_2^{opt}, \ldots, \underline{f}_{n_o}^{opt}]$ that achieve the maximum SNR are given by an orthonormal linear combination of the vectors $U\Gamma^{-1}[\underline{v}_1, \underline{v}_2, \ldots, \underline{v}_{n_o}]$, where $\underline{v}_1, \underline{v}_2, \ldots, \underline{v}_{n_o}$ are the eigen-vectors corresponding to the $n_o$ largest eigen-values of the matrix C.

A Max-SNR pre-filter may be configured as described below. By selecting the diagonal matrices $\Delta_d$ and $\Delta_u$, appropriately, the pre-filter 350 can be designed for channel shortening equalization (CSE), decision feedback equalization (DFE) or a combination thereof (hybrid). The pre-filter 350 may be configured with delay $\delta, n_m$ main taps and $n_b$ feedback taps, by the following diagonal matrices:

$$\Delta_d = \text{diag}(O_{n_i\delta}, I_{n_i n_m}, O_{n_i(L+M-\delta-n_m)}), \text{ and} \quad (14)$$

$$\Delta_u = \text{diag}(I_{n_i\delta}, O_{n_i n_m}, \gamma I_{n_i n_b}, I_{n_i(L+M-\delta-n_m, n_b)}), \text{ and} \quad (15)$$

where $I_n$ and $O_n$ are identity and zero matrices of dimension n×n, respectively, and γ is a scalar design variable referred to as the scaling factor. A CSE pre-filter is obtained by selecting γ=1 and $n_b$=0. A DFE pre-filter is obtained by selecting γ=0 and $n_m$=1. Note that the CSE pre-filter is designed to maximize the ratio of the energy in the main channel taps to the energy in the rest of the taps, while the DFE pre-filter is designed to maximize the ratio of the energy in one channel tap to the energy in the rest of the taps except the feedback taps. The feedback taps may be either completely supressed in CSE, or not suppressed at all in DFE. For a practical DFSE receiver, it may be desirable to find middle ground in choosing the feedback taps, because the feedback taps contribute to the signal energy captured while they also contribute to error propagation if they are too large. The feedback taps can be scaled up or down by setting the scaling factor γ to be between 0 and 1. A CSE pre-filter with γ<1 is referred to herein as a hybrid CSE pre-filter, and similarly a DFE pre-filter with γ>0 is referred to herein as a hybrid DFE pre-filter.

It may be apparent to those skilled in the art in view of the present invention that the feedback taps may be used as part of the desired taps in the matrix $\Delta_d$, and may be scaled down with respect to the main taps. Moreover, each feedback tap may be scaled separately and/or differently. The desired taps may be scaled differently based on different input channels (which may corresond to different users).

The Max-SNR CSE approach, described above, may maximize the energy in the main channel taps while constraining the noise to have an identity autocorrelation matrix. The hybrid Max-SNR-CSE pre-filter described above may provide a better SNR than the Max-SNR-CSE pre-filter because the feedback taps are not suppressed completely. The hybrid approach may thereby be more suitable for receivers that use DFE.

It may be apparent to those skilled in the art in view of the present invention that the pre-filters described above can be optimized for the filter delay δ. The optimization may be done on the basis of the SNR as defined by Equation 7, and/or may use an alternative SNR definition which takes into account the signal energy contained in the feedback channel taps.

The delay for each input branch may be optimized, or the relative delay can be optimized for a chosen filter delay. Such optimization may also be performed on the basis of the SNR as defined in Equation 7, or by another SNR definition.

Figure 4:
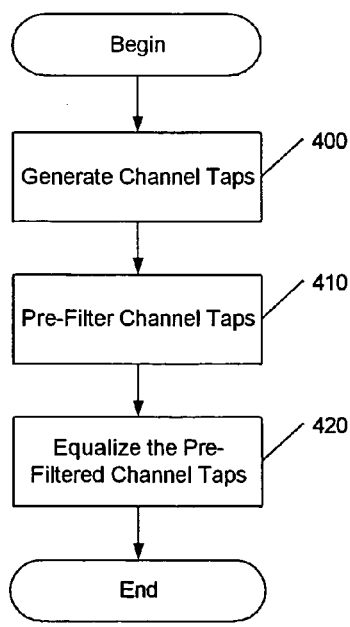
FIG. 4 is a flowchart of operations that may be performed to receive a signal from communication channel according to some embodiments of the present invention.

FIG. 4 illustrates a flow-chart of some of the primary operations that may be performed by a receiver according to some embodiments of the present invention. At Block 400, channel taps are generated based on an impulse response estimate of a MIMO communication channel. At Block 410, a received signal is pre-filtered to generate an output signal having increased SNR and uncorrelated noise. The SNR is based on a ratio of the energy in a first subset of the output channel taps to the energy in a second subset of the output channel taps. At Block 420, the output signal is equalized to provide an estimate of an information sequence in the received signal.

In the drawings and specification, there have been disclosed embodiments of the invention and, although specific terms are employed, they are used in a generic and descriptive sense only and not for purposes of limitation, the scope of the invention being set forth in the following claims.

The invention claimed is:

1. A method of receiving a signal from a multiple-input-multiple-output (MIMO) communication channel having a plurality of input channels and a plurality of output channels, the method comprising the steps of:
   generating initial taps that represent an impulse response estimate of the MIMO communication channel;
   generating prefilter taps based on the initial taps:
   generating output channel taps based on the generated initial taps and the generated prefilter taps;
   pre-filtering the received signal using the generated prefilter taps to generate an output signal, the output signal comprising a signal component and a noise component, which filtered noise affecting the output channels are mutually independent; and
   selecting the prefilter taps generated from the generated initial taps by calculating a maximized ratio of signal energy to noise energy (SNR) in some of the output channel taps in relation to a weighted sum of ratios of signal energy in other of the output channel taps and energy of the noise component of the output signal.

2. The method of claim 1, wherein generating prefilter taps further comprises generating a matrix of size No×No of prefilter taps, wherein No is a number of output channels of the MIMO communication channel.

3. The method of claim 1, wherein the weighted sum of ratios of signal energy in other of the output channel taps and energy of the noise component of the output signal is replaced by the weighted sum of ratios of signal energy for all other of the output channel taps and energy of the noise component of the output signal.

4. A receiver comprising:
   a channel estimator configured to generate initial taps that represent an impulse response estimate of a multiple-input-multiple-output (MIMO) communication channel having a plurality of input channels and a plurality of output channels;
   said channel estimator further configured to generate prefilter taps based on the initial taps;
   said channel estimator further configured to generate output channel taps based on the generated initial taps and the generated prefilter taps;
   a filter coupled to the channel estimator configured to pre-filter the received signal using the generated prefilter taps to generate an output signal, the output signal comprising a signal component and a noise component, which filtered noise affecting the output channels are mutually independent, the prefilter taps generated from the initial taps being selected by the channel estimator by calculating a maximized ratio of signal energy and noise energy (SNR) in some of the output channel taps in relation to a weighted sum of ratios of signal energy in other of the output channel taps and energy of the noise component of the output signal.

5. The receiver of claim 4, wherein the channel estimator is further configured to generate a matrix of size No×No of the prefilter taps, wherein No is a number of output channels of the MIMO communication channel.

6. The receiver of claim 4, wherein the weighted sum of ratios of signal energy in other of the output channel taps and energy of the noise component of the output signal is replaced by the weighted sum of ratios of signal energy for all other of the output channel taps and energy of the noise component of the output signal.

* * * * *